(12) United States Patent
Palau Dominguez

(10) Patent No.: US 8,230,556 B2
(45) Date of Patent: Jul. 31, 2012

(54) DISMOUNTABLE CLAMP

(75) Inventor: Ramon Palau Dominguez, Barcelona (ES)

(73) Assignee: ITW Metal Fasteners S.L., Barcelona (ES)

(*) Notice: Subject to any disclaimer, the term of this patent is extended or adjusted under 35 U.S.C. 154(b) by 883 days.

(21) Appl. No.: 12/159,893

(22) PCT Filed: Jan. 5, 2006

(86) PCT No.: PCT/ES2006/000002
§ 371 (c)(1),
(2), (4) Date: Jul. 9, 2008

(87) PCT Pub. No.: WO2007/077268
PCT Pub. Date: Jul. 12, 2007

(65) Prior Publication Data
US 2009/0025190 A1    Jan. 29, 2009

(51) Int. Cl.
*F16L 33/02* (2006.01)
(52) U.S. Cl. .............. 24/20 R; 24/20 CW; 24/20 W; 24/270; 24/271
(58) Field of Classification Search .............. 24/20 R, 24/20 CW, 20 W, 270, 271
See application file for complete search history.

(56) References Cited

U.S. PATENT DOCUMENTS

| | | | | |
|---|---|---|---|---|
| 2,249,764 A | | 7/1941 | Hothersall | |
| 4,299,012 A | * | 11/1981 | Oetiker | 24/19 |
| 4,492,004 A | * | 1/1985 | Oetiker | 24/20 R |
| 4,517,708 A | | 5/1985 | Calmettes et al. | |
| 4,622,720 A | * | 11/1986 | Oetiker | 24/20 TT |
| 4,756,060 A | * | 7/1988 | Ojima | 24/20 CW |
| 5,177,836 A | * | 1/1993 | Kemmerich | 24/20 R |
| 5,191,684 A | * | 3/1993 | Kenwright | 24/20 R |
| 5,274,886 A | | 1/1994 | Oetiker | |
| 5,305,499 A | * | 4/1994 | Oetiker | 24/20 R |
| 5,326,325 A | * | 7/1994 | Oetiker | 464/180 |
| 5,533,235 A | * | 7/1996 | Fukuda | 24/20 R |
| 5,537,721 A | | 7/1996 | Oetiker | |
| RE35,384 E | * | 12/1996 | Oetiker | 24/20 R |

(Continued)

FOREIGN PATENT DOCUMENTS

CN   1184901 A   6/1998

(Continued)

OTHER PUBLICATIONS

ISR for PCT/ES2006/000002 dated Jul. 19, 2007.

*Primary Examiner* — Robert J Sandy
*Assistant Examiner* — David Upchurch
(74) *Attorney, Agent, or Firm* — Lowe Hauptman Ham & Berner LLP

(57) ABSTRACT

A clamp includes a flat strip whose ends coil onto themselves in the shape of a ring and are fastened by a retaining pawl and a hook that are coupled in a retaining bridge and an orifice, respectively, for a further constriction of the clamp, that is brought to its optimal tightening position by pliers or other appropriate tools through tightening and deformation of the clamp bridge, which bridge is provided with a deformation that imparts said bridge greater inertial resistance and that in such tightening and advance movement of one end underneath the other an engagement has been provided for both ends by a tongue located at one end and a recess at the other end of the strip.

7 Claims, 2 Drawing Sheets

U.S. PATENT DOCUMENTS

| | | | |
|---|---|---|---|
| 5,740,589 A | 4/1998 | Dominguez | |
| 5,768,751 A | 6/1998 | Oetiker | |
| 6,131,245 A * | 10/2000 | Chi | 24/20 R |
| 6,282,774 B1 | 9/2001 | Borucinski et al. | |
| 7,421,930 B2 | 9/2008 | Oetiker et al. | |
| 2002/0189055 A1 | 12/2002 | Oetiker et al. | |

FOREIGN PATENT DOCUMENTS

| | | |
|---|---|---|
| CN | 1420975 A | 5/2003 |
| CN | 1520499 A | 8/2004 |
| EP | 0816740 A2 | 1/1998 |
| EP | 0946790 | 10/1999 |
| EP | 0697554 B2 | 2/2005 |
| ES | 0149843 U | 3/1971 |
| ES | 2126434 A1 | 3/1999 |
| ES | 2220182 A1 | 12/2004 |
| ES | 2223220 A1 | 2/2005 |
| GB | 2161207 | 1/1986 |
| JP | 63172085 A | 7/1988 |
| JP | 04-316703 A | 11/1992 |

\* cited by examiner

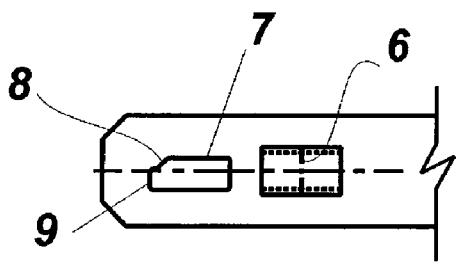
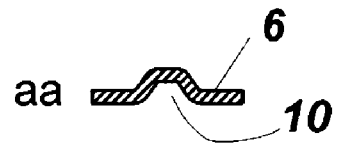
Fig. 3          Fig. 4
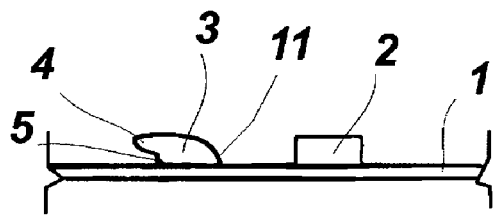
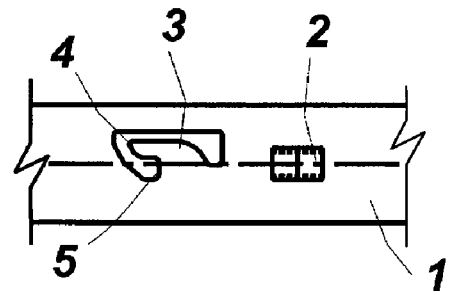
Fig. 5          Fig. 6
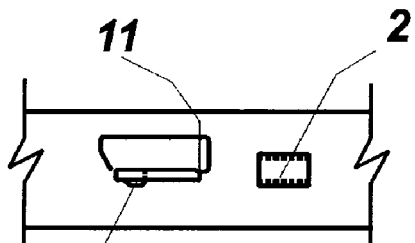
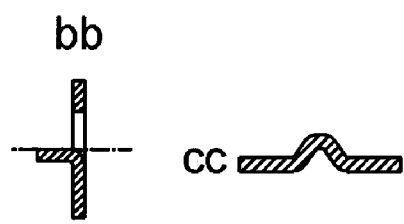
Fig. 7          Fig. 8
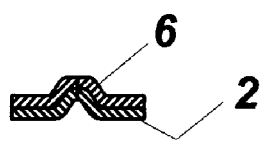
Fig. 9

DISMOUNTABLE CLAMP

RELATED APPLICATIONS

The present application is based on, and claims priority from, International Application Number PCT/ES2006/000002, filed Jan. 5, 2006, the disclosure of which is hereby incorporated by reference herein in its entirety.

FIELD OF THE INVENTION

The present invention describes a clamp of the type comprising a laminar strip that, once coiled onto itself, can be fastened so as to permit the constriction of pipes, hoses and the like by using, as closing means of the clamp, a hook and a retaining pawl that are obtained by stamping and deformation of the strip itself, whose shape is optimized to facilitate its guiding and engagement with the opposite portion of the clamp when being mounted, said clamp being capable of withstanding high clamping forces with a minimum need for material.

BACKGROUND OF THE INVENTION

The applicant of the present invention is also the applicant of other patents belonging to the same field of the art and has been developing clamps for pipes and sleeves since the mid-twentieth century seeking both to improve the models that from their own experience are susceptible to be improved and to create new products with greater efficiency.

Nowadays, clamps are required to meet ever stringent standards and, as a result of that, the improvements introduced occasionally relate to specific aspects of same, like in the present case, where the inventive emphasis is placed on the function of mutual guiding of the two ends of the clamp and obtaining a firm and secure fastening thereof, which should at the same permit disassembling of the clamp. That is to say, despite the fact that this is a very powerful locking that can undergo highly elevated tensions, its particular arrangement makes it possible for the clamp to be easily disassembled.

The clamp of the invention, in its fastened condition, is provided with means for clamping. To that goal, it includes a deformation bridge having means for guiding said deformation and for reinforcing its inertial tension. It is also provided with a tongue located at one of the ends of the clamp that permits easy guiding and engagement of said tongue with a stepped projection located at the opposite end of the clamp, which makes it possible to obtain a closed clamp devoid of steps that may damage pipes or hoses once the two ends of said clamp have become superposed after one of the ends has moved into the cavity created in the body of the other end. For instance, a deformation bridge like the one described in patent ES2223220 to Mikalor, S. A. can be used.

There are many examples in the prior art describing clamps of the type of the present invention that utilize butt ends, flanges and hooks which are obtained by stamping of the strip and are inserted in orifices provided at the other end. That is the case of utility model ES042946U, ES149843U and ES260128U, amongst many others.

Utility model ES257615U describes hooks obtained by stamping of the strip and further lifting of a portion of said strip, said hooks, upon fastening of the clamp, being inserted into opposed orifices provided at the other end of the strip.

Another example of already disclosed art is utility model ES257616U, in which flanges formed by stamping of the strip and further lifting of material are inserted into orifices provided at the other end of the strip.

European patent EP00946790 develops means for open clamp hooks for preventing disengagement of the connection during the tightening operation of the clamp, said hooks having two folds, so that a first oblique portion that projects externally relative to the surface of the strip is followed by another portion that runs approximately parallel to the strip and terminates in another oblique portion that projects outwardly of the strip.

Said embodiment may be provided with, either flat hooks having an inverted "L"-shaped section, or hooks obtained by stamping of a portion of the strip surface and further lifting along its side in the longitudinal direction of the strip until reaching a position perpendicular to same, where said profile can be obtained by performing appropriate staggered cuts.

U.S. Pat. No. 5,274,886 describes hooks also having a staggered working profile, although in this patent said hooks are used for pre-mounting a clamp that is modified by the definitive closing with a different use from that of patent EP00946790.

It is also known the provision of inverted "L"-shaped hooks, like in U.S. Pat. No. 4,492,004, in order to hinder accidental disengagement of said hooks during tightening of the clamp, although negative bending is not precluded due to the elevated forces applied for constraining present-day clamps.

As for the embodiment of patent EP00946790, it allows a first contact between the edge of the orifice into which the hook is inserted and the outermost surface of said hook during mounting operation of the clamp, so that when tightening of the clamp is underway the hook tends to slide along that side until it ends up engaged in the first inclined profile. At this stage, all the elements forming the clamp help to avoid disassembling of said clamp in a similar manner to the way the shape of the hook helps to prevent its negative folding.

However, the drawback of such a construction is that, as it occurs with clamps provided with a hook having one single inclined projection, the edge of the orifice can become blocked at any height and the engagement of all the elements responsible for fastening the clamp is not attained during pre-mounting of said clamp, and the same happens here with the third projection, which only proves to be useful for providing a greater mechanical resistance to the hook resulting from its ensuing greater surface.

As for the applicants of the present invention, they developed in their patent ES2126434 improvements to means for fastening intended to obtain greater clamping forces for clamps. For instance, for clamps affixed about pipes made from stiff plastic for which the high tightening forces that are required cannot be withstood by traditional fastening means.

According to the improvements of the aforesaid invention, two stamped portions are embedded in the opposite strip, this being similar to a clinching operation, which results in a clamp that is supplied in an already closed condition and that cannot be disassembled without precluding its breakage.

Performing cuts and deformations on the strip surface with the ensuing tunnels or recesses on said surface is also widely known. Patent U.S. Pat. No. 4,299,012, amongst many others, resorts to one of these constructions for guiding the clamp tongue during the process of constriction, thereby obviating discontinuities on the inner surface of the clamp.

Patent U.S. Pat. No. 4,492,004 discloses a construction that relates two tunnel-like strip deformations that extend one inside the other as means of support for the closing tools and means for constricting certain clamps that are provided with no such means of constriction. Said clamps are usually provided with hooks that perform the fastening or initial mounting of the clamp and other elements or positions of same for the definitive closure once the clamp has been constricted.

Patent EP0816740, for instance, uses said tunnels for tightening the clamp and also includes a hook obtained by stamping of the strip and further lifting of said hook along its side that coincides with the longitudinal direction of the strip, which is of a type similar to that of the present invention.

The above-mentioned clamp is not provided, like the one disclosed in patent EP00946790, with a hook having an edge with three projections. Such hook, that is conceptually similar to traditional inverted "L"-shaped hooks, has only two projections, one of which is a guiding projection that is inclined in the direction of the strip surface, and another one that runs vertical to said strip and defines the butt end at the edge of the orifice into which the hook is inserted.

The clamp disclosed in the present invention, since it is of the open type that is constricted by deforming the limbs of a Mikalor type bridge, as described in patent ES2223220, is mounted by engaging the hook in its corresponding orifice.

Said operation, due to the manner in which the hook and the orifice, which are closely related to each other, come into contact, optimizes the guiding function of one end of the clamp along the other in order to engage the retaining pawl with its respective retaining bridge, that is used as a retainer during mounting of the clamp and prior to its constriction.

The purpose is to obtain for the mounting operation of the clamp an optimal engagement of all its elements, so that when constraining of the clamp is underway by means of a pneumatic percussion wrench, for instance of the "unitary effort" type developed by Mikalor in patent ES2220182, which imparts considerable tension on the elements of the clamp, all of said elements can help in the fastening operation, thereby keeping the clamp from "springing" and become unfastened, and hence avoiding at the same time the proliferation of different fastening elements that make the clamp more expensive, render its manufacture more difficult and accentuate the irregularity of its surface with the ensuing increase in the number of cutting points with respect to its surrounding area.

Although the clamp can be supplied in a fully open condition, in order to economize storing space, it can also be supplied in a pre-formed condition and having a circular position, so as to facilitate coiling of the clamp about the hose or pipe on which it is used. The clamp can even be supplied in a pre-mounted condition, so that operators only have to manually disengage the hook at the other end of the clamp, place it about the pipe on which it is applied and close it again by engaging the hook in its corresponding orifice.

Once the clamp is mounted, thanks to the inclined mutual contact surfaces both of the orifice and the hook, it is also attained and optimal engagement of the retaining pawl with the retaining bridge that will for the most part withstand the force with which the Mikalor bridge is constrained.

The clamp, upon constriction, might be disassembled by disengaging the hook from its orifice with the aid of a suitable tool, with the ensuing advantages of the present invention, that is, obtaining a demountable clamp that does not need to be broken and is capable of withstanding high tightening forces with a reduced number of elements.

It is therefore a main object of the present invention to obtain a clamp with highly resistant fastening means that permits high clamp constricting forces using a reduced number of elements.

It is another main object of the invention to provide a clamp that permits easy mounting by an operator, with no need for the clamp to be supplied in its pre-mounted condition at the manufacturing plant.

It is another of the main objects of the invention that the above-described clamp can be disassembled without having to break it.

It is still another main object of the present invention to provide guiding means that help the operator assemble the clamp prior to its constriction.

BRIEF EXPLANATION OF THE INVENTION

The clamp of the present invention is provided with fastening means comprising a hook and a retaining pawl obtained by stamping and deformation of the flat strip, and an orifice also obtained by stamping at the opposite end of the clamp and a retaining bridge also obtained by stamping and deformation of the strip, said clamp having the characteristic that the hook is formed by a transverse wall that runs in the direction of the strip, whereas both the pawl and the retaining bridge are formed by roughly semicylindrical deformations in the longitudinal direction of the strip.

The hook, which is located in the longitudinal direction of the strip and in the direction towards the centre of the clamp, comprises a projection that defines an anchoring recess or cavity for embedding the strip upon mounting of the clamp. Such hook abuts against an edge of the corresponding orifice having an inclined profile into which said hook is inserted, said profile guiding said wall during mounting of the clamp to its final position in which both ends of the clamp end up perfectly aligned and the clamp is ready to be tightened about the tube being fixed.

The region of the clamp corresponding to said hook is configured with a view to making said hook more resistant.

The retaining pawl forms a semicylindrical butt end in the longitudinal direction of the strip, this butt end being inserted in an orifice having a similar shape that is provided at the opposite end, and lends high tightening resistance to the clamp in its mounted condition.

The optimized shape of both the retaining pawl and the hook makes it unnecessary to resort to additional retaining elements that would involve supplementary need for material, this material being habitually rust-resisting, with the ensuing increased costs.

The clamp is provided with a bridge for constraining the strip, which is of the Mikalor type, that is, said bridge is manufactured according to patent ES2223220 with deformed lateral walls and forming vertical walls that connect with the non-deformed region of the bridge through warped connections.

Said bridge is provided high inertial resistance to deformation, thereby high tightening forces being obtained, and at the same time, it guides, thanks to its configuration, its own deformation when being constrained, thereby both an excessive protrusion of the bridge off the perimeter of the strip and breakage of the bridge limbs being obviated.

The clamp is also provided at one of its ends with a tongue that, when being constrained, moves into a recess provided at the other end of the strip so as to obviate, once the clamp has been constricted, the creation of inner steps that would pinch the pipe about which it is coiled and cause leaking.

Utilization of this clamp becomes optimized through its tightening by means of a unitary effort wrench like the one developed by the applicant in patent ES2220182.

Said tool permits to obtain some pre-determined tightening force and degree of tightening, and therefore, it ensures the attainment of pre-determined bridge deformation. It is for that reason that the length of the tongue and the dimensions of the clamp, when so wished, are so calculated that said tongue fits perfectly into the recess therefor provided leaving absolutely no steps.

By the same token, the size and dimensions of the different elements comprising the clamp can be easily calculated, if so wished, so that in the manufacturing process of the clamp the right amount of material becomes used, thereby minimizing the disposal of left-over material.

BRIEF EXPLANATION OF THE DRAWINGS

Non-limitative drawings are accompanied for a better understanding of the invention and for purposes of illustration only. In said drawings numerals always refer to the same elements present throughout said drawings.

FIG. 3 is an enlarged plan detail of the orifice and the retaining bridge of the previous figure.

FIG. 4 is cross-sectional view, AA, of said retaining bridge according to the previous figures.

FIG. 5 is an elevation view of the region of the strip that is provided with the hook and the retaining pawl of the previous figures, once the clamp of the invention is formed.

FIG. 6 shows the surface of the clamp with the cuts forming the hook and the retaining pawl, so that a subsequent deformation permits to obtain the hook and the retaining pawl of the previous figure, in which said hook and said retaining pawl are in their respective working position and vertical to the plane of the strip.

FIG. 7 is an enlarged detail, in top view, of the hook of the previous figures and of the retaining pawl in working condition and ready to be inserted into the orifice and cavity provided at the opposite end of the clamp.

FIG. 8 shows respective transverse sections, BB and CC, of the clamp of FIG. 2. The first section shows in detail the region of the clamp corresponding to the hook, and the second section the region of the strip corresponding to the retaining pawl.

FIG. 9 shows a transverse section similar to that obtained with FIG. 4, that is to say, of the region of the clamp corresponding to the retaining bridge, although with the strip already pre-mounted, that is, with the retaining pawl inserted in the cavity defined by said retaining bridge.

DETAILED EXPLANATION OF THE INVENTION

Figure 1:
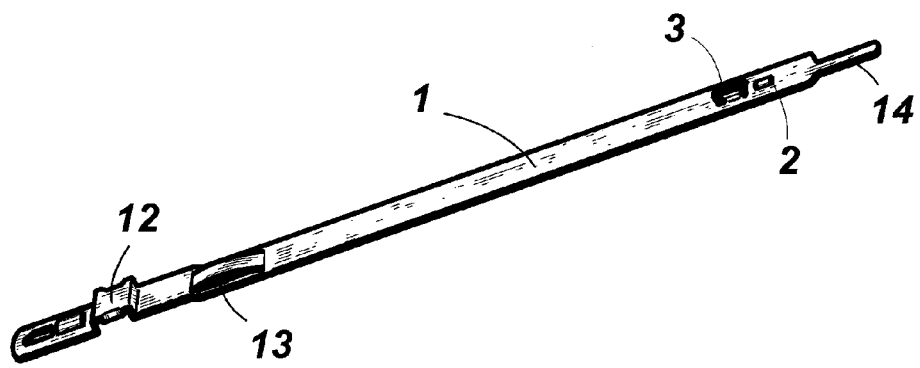
FIG. 1 is a perspective view of a clamp according to one of the embodiments of the present invention, with the deformation bridge, the tongue and the recess for its lodging. This clamp can be carried in boxes, in its pre-assembled condition as shown in the figure, which permits convenient packaging and transport and prevents it from being damaged as it can happen to clamps that are supplied in a pre-assembled condition.
Figure 2:
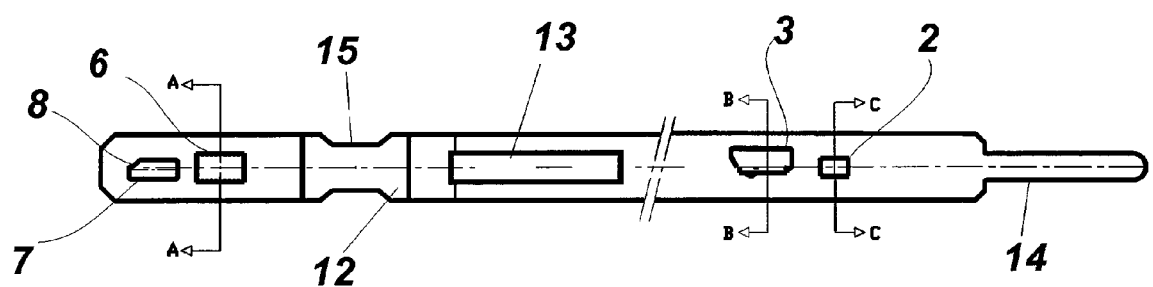
FIG. 2 is top view of the clamp of the previous figure. The hook and the retaining pawl can be seen near each end of the clamp on one side, and, on the other side it can be seen the orifice and the retaining pawl, into which said hook is inserted and said pawl is embedded, respectively.

The present invention consists of a dismountable clamp of the type having a flat strip whose ends are coiled onto themselves to form a ring, said ends being fixed or fastened for subsequently constraining the clamp and bringing it to its optimal tightening position by means of pliers or suitable wrenches, for instance by pressing and deforming its bridge (12) with some means or shaping (15), that provides more inertial resistance to said bridge and that in the above tightening movement and advance of an end underneath the other it has been provided an engagement of both ends by means of a tongue (14) and a recess (13) located at the other of the strip that accommodates it and forms a stepless inner surface when the clamp is in a tightened condition.

The fastening means for the clamp comprise a hook (3) and a retaining pawl (2) that are obtained by stamping and deformation of the strip (1) surface. Furthermore, the hook (2) is provided with a projection (4) in said central direction that closes the clamp and defines a recess (5) which permits constraining or coupling of the strip (1) material when the clamp is in its mounted condition and ready for being tightened.

Said hook (3), when the clamp is being mounted, is inserted into an orifice (7) obtained by stamped cutting of the strip and abuts against an edge (8) having an inclined profile that permits easy and convenient mounting of the clamp.

The surface of the strip (1) is reinforced and has a greater width in the region of the hook (3), so that when the hook (3) is being obtained by stamping, as shown in FIG. 6, the misalignment between the shape of the recess (5) and the rear shape (11) of the hook makes it possible to produce a reinforced hook (3) after the shaping operation.

Such reinforcement prevents deformation caused by lifting of the hook during the closing operation due to the moment of application of the clamp's constraining force. The off-centering of the hook (3) with respect to the longitudinal axis of the strip (1) permits to obtain the shape defined in the invention without diminishing the resistance of said strip (1) and without weakening its punch-like shape.

The function of said hook (3) is to keep correctly positioned the strip during closing operation. Moreover, the hook permits, if necessary, mounting of the clamp in the last assembly stages, since it is possible to open and mount said clamp at the place of application. It also ensures retention of the strip in conjunction with the retaining bridge (2).

The retaining pawl (2) is obtained through cutting by stamping of the material forming the strip and subsequent deformation by outwardly lifting the surface of the strip, thereby creating a transverse wall having approximately the shape of an inverted "V" facing the direction of closing of the clamp. Said retaining pawl (2) is inserted into a cavity (10) also obtained by stamping and deformation of the strip in the proximity of its other end.

When the operator uses a clamp having the fastening means of the invention, he/she closes the clamp on itself, inserts the pipe to be constricted and joins both ends of the clamp after inserting the retaining pawl (2) and the hook (3) in their respective cavity and orifice (10 and 7).

It is at this point when it can be observed one of the advantages of the present invention over the known art, for the shape of the orifice (7) is wide enough to make it possible to easily insert the hook (3) and it is further provided with an inclined edge (8) that permits convenient lateral displacement of the hook (3) while the retaining pawl (2) gets engaged in its respective cavity (10), which is the moment when the strip becomes perfectly aligned and the recess (5) of the hook (3) while abutting against the closing edge (9) of the orifice (7) retains and securely fastens one end of the strip (1) over the other.

Furthermore, the retaining bridge (6), which defines the inner cavity (10) for lodging of the retaining pawl (2) becomes a highly resistant retaining element since no strip-forming material is eliminated and is secure in the sense that from its shape no edges or projections emerge that could hurt neither the operators that manipulate the clamp nor any of the elements adjacent to said clamp.

An important advantage of the present invention over the known art as far as the replacement of the hook-orifice combination by a retaining pawl-retaining bridge combination is concerned, is that through the replacement of the orifice by a retaining bridge (6) it is obtained an optimization of the resistant surface of the strip, thereby making it more unlikely that said strip breaks while being constrained, which additionally reduces manufacturing costs owing to the fact that it is obviated the existence of left-over material to be disposed of.

Besides, there exists a relation between the width of the strip and the total width of said retaining bridge (6). Actually, total width of the bridge is to be minimized as much as possible and said width can never exceed 0.5 times the width of the strip in order to prevent breakage of the clamp when it is subjected to high tightening forces.

Furthermore, the retaining pawl (2) serves the purpose of having the maximum retaining surface with the minimum use of material, since otherwise the width of the strip in that region would become considerably reduced.

Determinative elements for achieving the efficiency of said retaining pawl (2) are its height and its inner shape. Said total height, for the sake of ensuring a correct holding ability, must be a minimum of 2.5 times the width of the material. The inner region of the pawl (2), which has a flat region, permits to obtain optimal efficiency, since clamps are manufactured by punching, with punchs used in the shaping of the strip, which is habitually manufactured with very hard rust-resistant materials.

Said pawl (2) must be long enough to serve its purpose and for preventing breakage of same by shearing. In any case, and in order to allow mounting and disassembling of the clamp, the pawl must be approximately 0.6 times less long than the length of the retaining bridge. The approximate inverted "V" shape used both for the pawl (2) and the bridge (6) makes it possible to obtain the best results in terms of resistance with the minimum use of material.

It is to be noted the double shearing, front and rear shearing, both of the pawl (2) and the retaining bridge (6) that permits to have a contact surface, and hence, a surface for retention that is perpendicular to the strip, which prevents the retaining bridge (6) from superposing on the retaining pawl (2) during closing operation, this bringing about, instead, an optimal engagement of said pawl (2) into said retaining bridge (6).

Once the clamp is mounted, tightening of same can take place, for instance by means of a pneumatic percussion wrench with tightening control such as the one described in Spanish patent ES2220182, or with another less precise tool, through deformation with the above-mentioned tools of the deformation bridge, which is habitually provided with means for reinforcing its inertial tension, like for example the one described in the patent to Mikalor ES2223220.

In the above operation, on the one side, and according to the known art, a tongue provided at one end of the clamp moves into a recession located at the other end of the strip which guides the closing advance of the clamp and creates a housing for said tongue.

Consequently, the inner ring of the already constrained clamp does not have discontinuities or steps on its surface that may damage the pipe on which it is fixed, this being possible due to the fact that the size of the tongue and its distance with respect to the recess for engagement of said tongue in the strip are so calculated that when the clamp is constrained with a pre-determined force and degree of bridge deformation, the tongue gets fully inserted into the recess for lodging of said tongue with no steps whatsoever on the inner surface of the clamp that might damage the hose to be constrained.

It has to be pointed out that the retaining pawl (2), that represents a aligned butt end in the direction of the closing of the clamp, and the hook (3) itself, that inserts into its recess (5) the surface (1) of the other end of the clamp and is in the shape of an aligned transverse wall in the direction of the closing of the clamp, impart to the assembly an elevated resistance for withstanding high tightening forces without hindering fastening of the clamp and with no need for additional retaining elements that would involve supplementary use of material, this being usually rust-resistant, and the ensuing increase in costs.

Additionally, the recess (5) of the hook (3) permits a kind of fastening that keeps the joint of the strip from breaking, thereby breaking the ends of the clamp free and causing it to spring with the ensuing danger for the operator that is installing the clamp. And this effect occurs both during the mounting of the clamp and the joining of its ends about the pipe of hose on which the clamp is going to be used and, in the constriction phase of the clamp.

When it is wished to disassemble the clamp and to disengage the joining disclosed by the present invention, both, when the clamp has only been mounted and, when it has already been tightened, the operator, by means of pliers or a pneumatic percussion wrench with tightening control, can pull apart both hooks and disassemble the clamp by, for instance, holding with one tip of the wrench one limb of the deformation bridge and with the other tip of the wrench the retaining pawl (2) and further applying suitable force for separating the fastening from the recess (5) against the edge (9) so that the fastening process can be inverted.

It is also to be noted that the particular shaping of the hook (3) of the present invention makes it possible, when it is so wished for a mounted clamp, to fully close said hooks by knocking them down with a wrench onto the surface of the strip (1), which imparts even more firmness to the fastening and obviates the existence of protruding elements capable of scratching. In that arrangement, however, it would not be possible to disassemble the clamp.

It is understood that in the present case variations which do not alter or modify the essence of the invention may be applied to details of the embodiment described.

The invention claimed is:

1. A dismountable clamp comprising:
   a strip having ends configured to be fastened to form a ring prior to constriction to an optimal tightened position;
   a bridge having a shape providing greater inertial resistance to the bridge after constriction;
   an advance of one end of the strip configured to be positioned underneath another end of the strip to form a stepless inner surface;
   a retaining pawl having an approximately inverted "V" shape facing a closing direction of the dismountable clamp;
   a single hook; and
   an orifice configured to receive the hook, wherein
   the hook is formed by stamping a strip surface,
   a hook surface extends perpendicular to the strip surface and a side of the hook is aligned with a longitudinal direction of the strip,
   the hook has a projection in a central and closing direction of the dismountable clamp defining a recess configured to be mounted against a closing edge of the orifice,
   the orifice having an edge having an inclined profile with respect to an exterior edge of the dismountable clamp, wherein the hook is configured to engage the edge having the inclined profile to permit lateral displacement of the hook to align the ends of the strip, a width of the orifice is greater than a width of the hook, and the retaining pawl configured to be inserted into a retention bridge having approximately the same shape as the retaining pawl and defining an inner longitudinal cavity located in proximity to the other end of the strip.

2. The dismountable clamp according to claim 1, wherein a shape of the recess and a shape of a rear portion of the hook are misaligned.

3. The dismountable clamp according to claim 1, wherein a length of the retaining pawl is about 0.6 times less than that of the retaining bridge.

4. The dismountable clamp according to claim 1, wherein a total height of the retaining pawl is at least, about 2.5 times greater than a width of the strip.

5. The dismountable clamp according to claim 1, wherein a width of the retaining bridge, in a transverse direction of the strip, is less than or equal to about 0.5 times a width of the strip.

6. The dismountable clamp according to claim 1, wherein a longitudinal position of the hook is not aligned with respect to a longitudinal axis of the strip.

7. The dismountable clamp according to claim 1, wherein the hook is configured to be knocked down onto a surface of the strip after the dismountable clamp is mounted.

* * * * *